No. 682,132. Patented Sept. 3, 1901.
C. BLACKWELL.
HAY RAKE.
(Application filed Nov. 30, 1900.)
(No Model.)
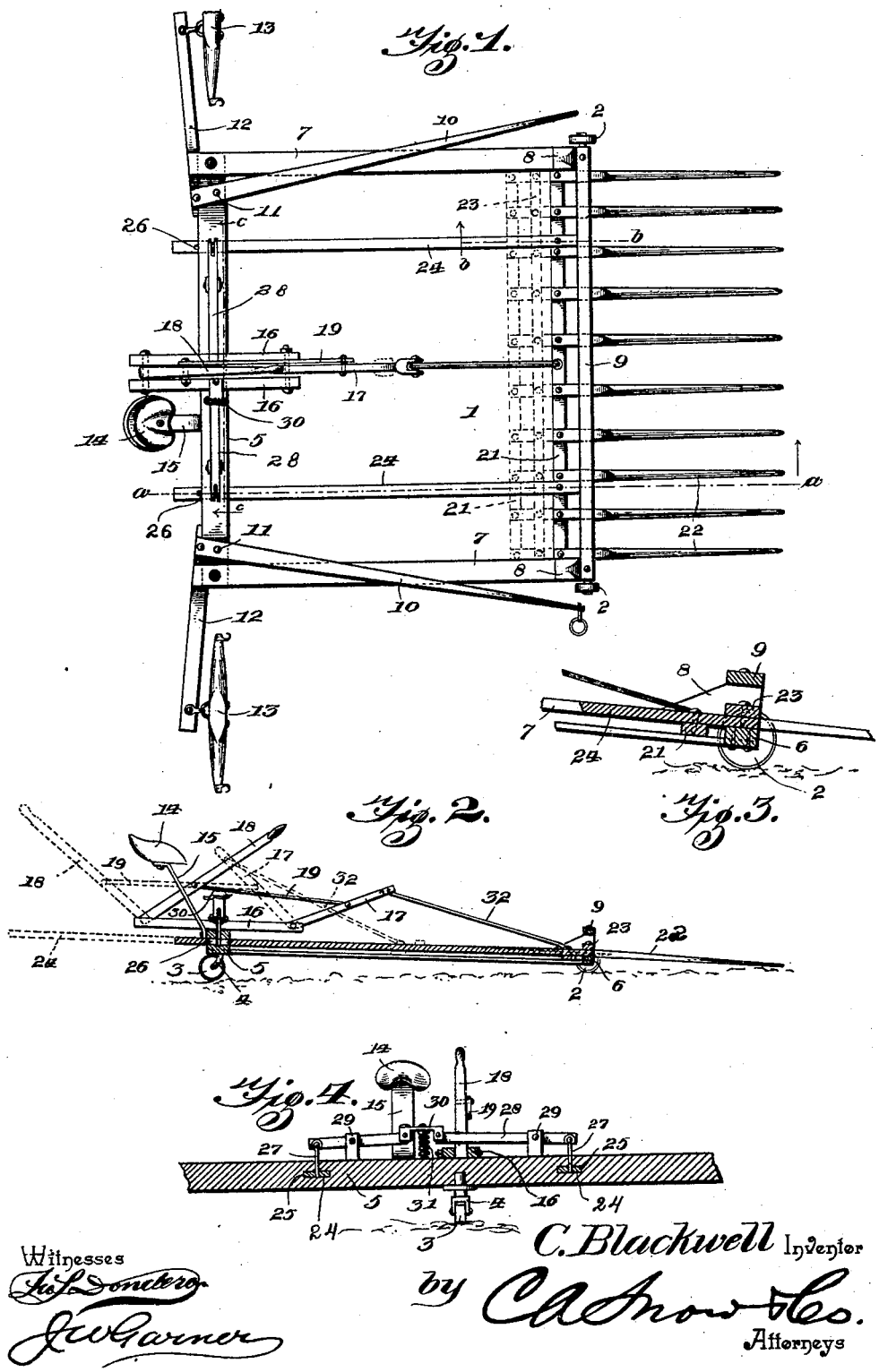

UNITED STATES PATENT OFFICE.

CHARLES BLACKWELL, OF VINITA, INDIAN TERRITORY, ASSIGNOR TO
G. W. BLACKWELL, OF SAME PLACE.

HAY-RAKE.

SPECIFICATION forming part of Letters Patent No. 682,132, dated September 3, 1901.

Application filed November 30, 1900. Serial No. 38,204. (No model.)

*To all whom it may concern:*

Be it known that I, CHARLES BLACKWELL, a citizen of the United States, residing at Vinita, in the Cherokee Nation, Indian Territory, have invented a new and useful Hay-Rake, of which the following is a specification.

My invention is an improved horse hay-rake, which is adapted especially for use in conveying hay from a field to a hay-stacking machine; and it consists in the peculiar construction and combination of devices hereinafter set forth, and pointed out in the claims.

In the accompanying drawings, Figure 1 is a top plan view of a horse hay-rake embodying my improvements. Fig. 2 is a sectional view of the same, taken on a plane indicated by the line *a a* of Fig. 1. Fig. 3 is a detail sectional view, on a larger scale, taken on a plane indicated by the line *b b* of Fig. 1. Fig. 4 is a detail sectional view taken on a plane indicated by the line *c c* of Fig. 1.

The frame 1, which is rectangular in form, is supported at its front corners by the wheels 2 and the rear side thereof is supported by a caster-wheel 3, the frame 4 of which is pivoted centrally under the rear cross-bar 5 of the said frame. The front cross-bar 6 of the frame is connected to the rear cross-bar 5 by side bars 7. Standard-blocks 8 are secured on the upper sides of the upper side bars 7 at the front ends thereof, and the said standard-blocks are connected together by a cross-bar 9, which is secured on the upper side thereof. Poles 10 project obliquely beyond the sides of the frame 1, the rear ends of the said poles being secured on the rear cross-bar 5, as at 11. Draft-bars 12 have their inner ends secured on the rear side of the frame 1, and said draft-bars project laterally beyond the sides of the said frame and are provided at their outer ends with singletrees 13 for the attachment of the draft-animals. The breast or holdback straps are attached to the front ends of the poles 10, which may be provided with hooks or other suitable devices for that purpose.

From the foregoing and by reference to Fig. 1 of the drawings it will be understood that the draft-animals are disposed beyond the sides of the frame and that the same may be driven and guided in any desired direction.

A seat 14 for the driver is supported in rear of the rear cross-bar 5 by the usual bar or spring 15. Longitudinally-disposed bars 16, of which there are a pair, are secured at or near the center of the rear cross-bar 5 on the upper side thereof. Between the front ends of the said bars 16 is pivoted the lower end of a link-lever 17, and between the rear ends of said bars 16 is pivoted the lower end of a hand-lever 18. Said levers 17 and 18 are connected together by a rod 19 and are thereby adapted to move in unison. The hand-lever is in convenient reach of the driver.

The rake-head 20 comprises a cross-bar 21, the ends of which are disposed between the pairs of side bars 7 and operate in the guideways formed between the said pairs of bars, fingers 22, which have their rear ends secured on said bar 21, and a cross-bar 23, which is secured on the said fingers near the rear ends thereof and at a suitable distance in front of cross-bar 21. Guide and adjusting bars 24 have their front ends secured to the cross-bars 21 23, and the rear ends of said guide and adjusting bars operate in transversely-disposed openings in the rear cross-bar 5 of frame 1. Said openings are designated by the reference-numeral 25. The rear portions of the said guide and adjusting bars are provided with locking openings 26, which may be engaged by vertically-disposed locking-pins 27, carried by the outer ends of locking-bars 28, which are fulcrumed on supports 29 on the rear cross-bar 5. The inner ends of said locking-bars are connected together by a pedal-link 30, and a spring 31 bears upward under the said pedal-link, and when the rake-head is run forward, so as to project the rake-fingers beyond the front side of the frame 1, the said spring causes the inner ends of the locking-bars 28 to be raised and the outer ends of said bars to be depressed and to engage the locking-pins 27 with the locking openings 26 in the guide and adjusting bars 24, so as to lock the rake-head in its forward extended operative position. The link-lever 17 is connected to the cross-bar 21 of the rake-head by an operating-rod 32, and hence the rake-head may be moved forward to an operative position or drawn backward, so as to dispose the teeth or fingers thereof within the frame 1 by means of the hand-lever 18. The locking openings 26 are here shown as somewhat elongated to facilitate the adjustment of the rake-head and the disposition of the said openings with relation to the locking-pins 27, so that the latter will readily enter said openings.

When the rake-head is extended forward, the rake is adapted to gather hay from a field, either when in the condition as left thereon by the mowing-machine or from windrows or cocks, the hay when thus gathered and loaded on the teeth or fingers of the rake being supported thereon by the elevated cross-bar 9 and prevented from sweeping rearward over the frame 1 as the rake advances. When the stacking-machine or other point where the hay is to be unloaded from the rake is reached, the hay may be discharged from the rake by moving the rake-head rearward, the elevated cross-bar 9 coacting with the rake-head to withdraw the rake-teeth from under the load of hay, so as to drop the same either onto the elevating-fork of a hay-stacker or onto the ground, as the case may be. A horse hay-rake thus constructed is exceedingly cheap and simple, is strong and durable, and is exceedingly efficient in raking hay from the field and conveying the same to a hay-stacker. When my improved horse hay-rake is used, the hay when mowed may be left on the ground until cured and not thrown into windrows or disposed in cocks, as is usually done.

Having thus described my invention, I claim—

1. In a horse hay-rake, the combination of a wheeled supporting-frame and a rake-head on the front side thereof, said rake-head being longitudinally movable so that the rake teeth or fingers may be extended in advance of the front side of the frame or drawn rearward thereon to clear the same of hay, and a lever and connections to move said rake-head forwardly and rearwardly, substantially as described.

2. In a horse hay-rake, the combination of a wheeled supporting-frame, a rake-head on the front side thereof supported by said frame and movable longitudinally for the purpose set forth, said rake-head having longitudinally-disposed guiding and adjusting bars, means coacting therewith to secure the said rake-head when adjusted and a lever and connections to adjust the said rake-head, substantially as described.

3. In a horse hay-rake, the combination of a wheeled supporting-frame, a rake-head on the front side thereof, supported by said frame, and movable longitudinally, for the purpose set forth, said rake-head having longitudinal guide and supporting bars, locking-bars on the rear side of the supporting-frame having locking-bolts to engage and secure said guiding and supporting bars, a pedal-link connecting the said locking-bars and a lever and connections to operate the rake-head, substantially as described.

In testimony that I claim the foregoing as my own I have hereto affixed my signature in the presence of two witnesses.

CHARLES BLACKWELL.

Witnesses:
W. S. STANFIELD,
J. F. WALKER.